(12) United States Patent
Yin

(10) Patent No.: US 12,743,484 B2
(45) Date of Patent: Sep. 22, 2026

(54) SIGNAL ANALYSIS METHOD AND SYSTEM BASED ON MODEL FOR ACQUIRING AND IDENTIFYING NOISE PANORAMIC DISTRIBUTION

(71) Applicant: CHENGDU PANOAI INTELLIGENT TECHNOLOGY CO., LTD, Chengdu (CN)

(72) Inventor: Yu Yin, Chengdu (CN)

(73) Assignee: CHENGDU PANOAI INTELLIGENT TECHNOLOGY CO., LTD, Chengdu (CN)

( * ) Notice: Subject to any disclaimer, the term of this patent is extended or adjusted under 35 U.S.C. 154(b) by 568 days.

(21) Appl. No.: 18/247,842

(22) PCT Filed: Jun. 10, 2021

(86) PCT No.: PCT/CN2021/099384
§ 371 (c)(1),
(2) Date: Apr. 4, 2023

(87) PCT Pub. No.: WO2022/116508
PCT Pub. Date: Jun. 9, 2022

(65) Prior Publication Data
US 2023/0385378 A1 Nov. 30, 2023

(30) Foreign Application Priority Data
Dec. 4, 2020 (CN) ......................... 202011411339.2

(51) Int. Cl.
*G06F 18/214* (2023.01)
*G06F 18/15* (2023.01)

(52) U.S. Cl.
CPC ............ *G06F 18/214* (2023.01); *G06F 18/15* (2023.01)

(58) Field of Classification Search
CPC ........ G06F 17/18; G06F 18/15; G06F 18/214; G06F 2218/00; G06F 2218/04
See application file for complete search history.

(56) References Cited

U.S. PATENT DOCUMENTS

2010/0318482 A1* 12/2010 Bartlett .................. G16B 40/20 706/12
2014/0025356 A1* 1/2014 Kosko ..................... G06F 17/18 703/2
2020/0293594 A1* 9/2020 Raissi ..................... G06F 30/27

* cited by examiner

*Primary Examiner* — Yoshihisa Ishizuka
(74) *Attorney, Agent, or Firm* — Westbridge IP LLC

(57) ABSTRACT

Disclosed are a signal analysis method and system based on obtaining and recognizing a noise panorama distribution model, which relate to the technical field of signal analysis. The method includes the following steps: in a rich condition measurement environment, performing repeated measurements on a reference sample and a test sample to respectively obtain a plurality of measurement results; processing the measurement results of the reference sample and the test sample to respectively form training data of the reference sample and the test sample; based on the training data of the reference sample and the test sample, enabling a model to recognize a signal and noise from the measurement results, and distinguish between the reference sample and the test sample; and inputting a measurement result of a sample to be recognized to the trained artificial intelligence model, where an output result is a specific type of the sample to be recognized.

10 Claims, 2 Drawing Sheets

S1
In a rich condition measurement environment, perform repeated measurements on a reference sample and a test sample to respectively obtain a plurality of measurement results, where each measurement result includes a signal and different noise profiles S2
Processing the measurement results of the reference sample and the test sample to respectively form training data of the reference sample and the test sample, where the training data includes a noise panorama or at least a partial noise panorama constituted by a plurality of noise profiles S3
Based on the training data of the reference sample and the test sample, with the observability of noise as a convergence goal, train an artificial intelligence model, to enable the model to recognize the signal and the noise from the measurement results, and distinguish between the reference sample and the test sample S4
Input a measurement result of a sample to be recognized to the trained artificial intelligence model, where an output result of the artificial intelligence model is a specific type of the sample to be recognized

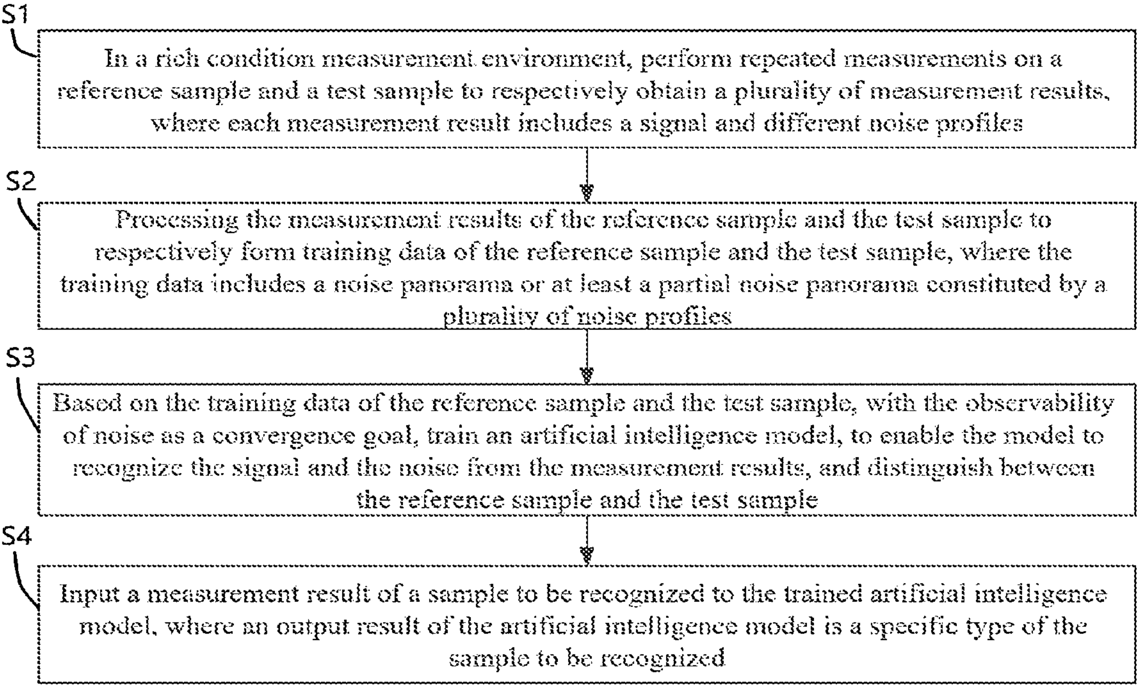
FIG. 1
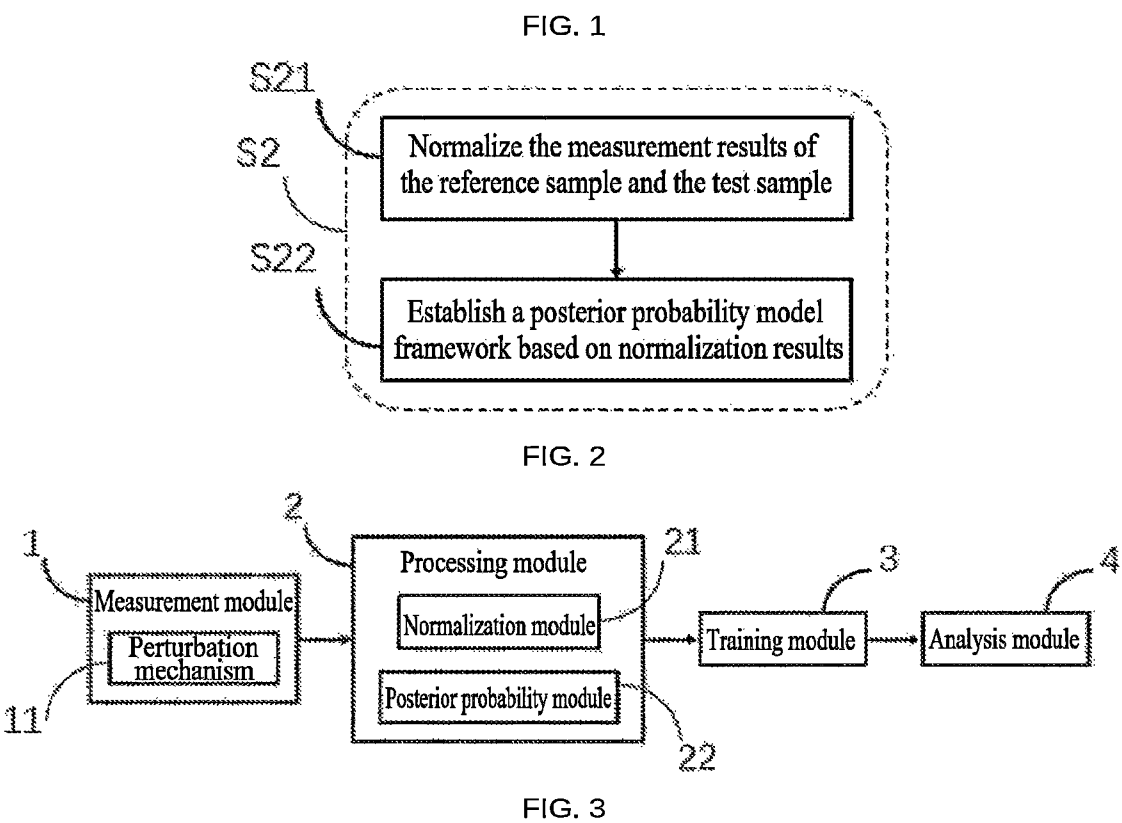
FIG. 2
FIG. 3

SIGNAL ANALYSIS METHOD AND SYSTEM BASED ON MODEL FOR ACQUIRING AND IDENTIFYING NOISE PANORAMIC DISTRIBUTION

TECHNICAL FIELD

The present invention pertains to the technical field of signal analysis, and in particular relates to a signal analysis method and system based on obtaining and recognizing a noise panorama distribution model.

BACKGROUND ART

In response to applications and needs in many practical fields, there are a wide variety of sample measurement means in the prior art, such as electrocardiogram signals and electroencephalogram signals in the field of physiological detection, and spectral signals in the field of material detection. However, due to multiple factors such as a measurement environment, equipment precision, and properties of a sample itself, regardless of which sample measurement means is selected, a measurement result is always mixed data of a signal and noise. It is difficult to extract a signal from a measurement result with a low signal-to-noise ratio. As a result, it is difficult to make a comprehensive and effective analysis of the signal, which directly affects the accurate cognition of the sample.

In order to solve the above problem, two technical directions for dealing with noise are given in the prior art as follows: 1. In a sample measurement stage, noise is controlled or suppressed by taking such measures as improving the equipment precision and the measurement environment, such that the strength of the signal far exceeds that of the noise, so as to obtain a measurement result with a high signal-to-noise ratio. 2. In a result analysis stage, a mathematical method is used to construct a mathematical model based on a pre-assumed statistical distribution of noise, and the mathematical model is used to remove the noise, so as to further increase an overall signal-to-noise ratio of the measurement result.

The above two methods can solve the noise problem in some cases to a certain extent. However, two insurmountable defects persist.

First, noise acquired during sample measurement and mixed in a signal may be non-linear, and may also have quite complex forms and contents. For example, for a measurement result of an image sample, noise at different positions may vary from each other; and for a measurement result of an audio sample, noise on different tracks, or even noise at different moments on the same track, may vary from each other. It is difficult to carry out conventional mathematical noise reduction methods in existing engineering technologies directly on such complex noise. In other words, it is difficult to design a denoising solution using one or several common mathematical models, resulting in a failure to increase a signal-to-noise ratio of the measurement result to a level sufficient for analysis.

Second, during actual sample measurement, in order to obtain a measurement result with a high signal-to-noise ratio, conditions such as the sample measurement environment and equipment precision may be fully optimized. Nevertheless, limited by the properties of the sample itself and other objective factors, the measurement result may still have the following properties: 1. A signal in the measurement result can be detected, that is, the strength of the signal is at or above the measurable lower limit of the measurement equipment. 2. The signal is extremely weak, and the strength thereof is at the same level as that of the noise or even lower. 3. The signal itself has very complex characteristics. For a measurement result having the above properties, there is a great probability that the signal is drowned out by noise. Conventional mathematical noise reduction methods have difficulties in processing such measurement results, because it is difficult to establish a reasonable mathematical model to simulate and remove noise mixed in the measurement results. As a result, the signal is hardly separable from the noise, and even a high-value signal is eliminated together with the noise during the denoising.

SUMMARY

The main objective of the present invention is to provide a signal analysis method based on obtaining and recognizing a noise panorama distribution model, aiming to solve the technical problem that it is difficult to analyze a complex signal under ultra-low signal-to-noise ratio conditions in the prior art.

To achieve the foregoing objective, the technical solutions of the present application are as follows:

A signal analysis method based on obtaining and recognizing a noise panorama distribution model includes the following steps:

- S1: in a rich condition measurement environment, performing repeated measurements on a reference sample and a test sample to respectively obtain a plurality of measurement results, where each measurement result includes a signal and different noise profiles, and a rich condition is a natural measurement condition that is not aimed to maintain the consistency of external conditions, does not involve noise suppression, and includes real complex noise factors;
- S2: processing the measurement results of the reference sample and the test sample to respectively form training data of the reference sample and the test sample, where the training data includes a noise panorama or at least a partial noise panorama constituted by a plurality of noise profiles;
- S3: based on the training data of the reference sample and the test sample, with the observability of noise as a convergence goal, training an artificial intelligence model, to enable the model to recognize the signal and the noise from the measurement results, and distinguish between the reference sample and the test sample; and
- S4: inputting a measurement result of a sample to be recognized to the trained artificial intelligence model, where an output result of the artificial intelligence model is a specific type of the sample to be recognized.

Optionally, in step S1, before each measurement of the reference sample and the test sample, the rich condition measurement environment is created by introducing perturbations, to add a noise observation dimension, such that a measurement result of each measurement includes different noise profiles.

Further, the perturbations may be selected from, but are not limited to, a spatial perturbation, a temporal perturbation, a physical perturbation, and an environmental perturbation; and the spatial perturbation includes, but is not limited to, a slight displacement of a measurement site and a slight rotation of the measurement site; the temporal perturbation includes, but is not limited to, increasing a measurement duration, reducing the measurement duration, and changing a time interval between a plurality of measurements; the physical perturbation includes, but is not limited to, vibration of measurement equipment or the samples and agitation of a fluid sample during the measurement; and the environmental perturbation includes, but is not limited to, changing ambient temperature during the measurement, changing ambient humidity during the measurement, changing an electromagnetic field during the measurement, and changing barometric pressure during the measurement.

Further, in step S2, the step of processing the measurement results of the reference sample and the test sample to respectively form training data of the reference sample and the test sample includes:

S21: normalizing the measurement results of the reference sample and the test sample; and S22: establishing a posterior probability model framework based on normalization results of step S21.

After the measurement results of the reference sample and the test sample are processed in steps S21 and S22, eligible training data thereof is formed respectively, for use in subsequent training of an artificial intelligence model.

In the process of forming the training data from the measurement results of the reference sample and the test sample, different noise profiles constitute the noise panorama or at least the partial noise panorama. In addition, an overall measurement result of the two types of samples and the signal in the measurement result both present stable statistical properties. A statistical distribution pattern presented by the noise also tends to be stable with the construction of the noise panorama.

In step S3, the artificial intelligence model may be selected from, but is not limited to, an artificial neural network, a perceptron, a support vector machine, a Bayesian classifier, a Bayesian network, a random forest model, or a clustering model.

In step S3, during a training process of the artificial intelligence model, the model iteratively performs a large amount of experiential learning, induction, and convergence on features that allow to recognize the signal and the noise, as well as features that allow to distinguish between the reference sample and the test sample, that are included in the training data, and learns a relationship between the features and preset labels.

Specifically, the features that allow to recognize the signal include a statistical distribution pattern presented after the processing of the plurality of measurement results and conforming to the real mathematical and statistical laws of the signal; the features that allow to recognize the noise include a statistical distribution pattern presented by the noise panorama or at least the partial noise panorama constructed by the diverse noise profiles and approaching the real mathematical and statistical laws of the noise; and the features that allow to distinguish between the reference sample and the test sample include statistical distribution patterns presented respectively after the processing of the plurality of measurement results of the reference sample and the test sample.

Further, the preset labels include output labels and input labels. The output labels include two labels respectively representing the reference sample and the test sample. The input labels are two sets of coupling labels respectively relating to the training data of the reference sample and the test sample, and each coupling label is associated with the rich condition measurement environment during the sample measurement.

Specifically, each coupling label from different sets represents a coupling of the measurement result of the reference sample or the test sample to the noise panorama in each independent measurement environment of the rich condition measurement environment. The noise profile included in the measurement result is a noise profile obtained in this independent measurement environment.

The present invention further provides a signal analysis system based on obtaining and recognizing a noise panorama distribution model, including a measurement module, a processing module, a training module, and an analysis module.

In a rich condition measurement environment, the measurement module performs repeated measurements on a reference sample and a test sample to respectively obtain a plurality of measurement results, where each measurement result includes a signal and different noise profiles, and a rich condition is a natural measurement condition that is not aimed to maintain the consistency of external conditions, does not involve noise suppression, and includes real complex noise factors.

The processing module processes the measurement results of the reference sample and the test sample to respectively form training data of the reference sample and the test sample, where the training data includes a noise panorama or at least a partial noise panorama constituted by a plurality of noise profiles.

Based on the training data of the reference sample and the test sample, with the observability of noise as a convergence goal, the training module trains an artificial intelligence model, to enable the model to recognize the signal and the noise from the measurement results, and distinguish between the reference sample and the test sample.

The analysis module inputs a measurement result of a sample to be recognized to the trained artificial intelligence model, where an output result of the artificial intelligence model is a specific type of the sample to be recognized.

Optionally, the measurement module includes a perturbation mechanism, and before the measurement module performs each measurement of the reference sample and the test sample, the perturbation mechanism creates the rich condition measurement environment by introducing perturbations, to add a noise observation dimension for the sample measurement, such that a measurement result of each sample measurement includes different noise profiles.

Further, the perturbations introduced by the perturbation mechanism before each measurement of the reference sample and the test sample may be selected from, but are not limited to, a spatial perturbation, a temporal perturbation, a physical perturbation, and an environmental perturbation.

The spatial perturbation includes, but is not limited to, a slight displacement of a measurement site and a slight rotation of the measurement site; the temporal perturbation includes, but is not limited to, increasing a measurement duration, reducing the measurement duration, and changing a time interval between a plurality of measurements; the physical perturbation includes, but is not limited to, vibration of measurement equipment or the samples and agitation of a fluid sample during the measurement; and the environmental perturbation includes, but is not limited to, changing ambient temperature during the measurement, changing ambient humidity during the measurement, changing an electromagnetic field during the measurement, and changing barometric pressure during the measurement.

Further, the processing module includes a normalization module and a posterior probability module.

The normalization module normalizes the measurement results of the reference sample and the test sample to respectively output normalization results; and the posterior probability module establishes a posterior probability model framework based on the normalization results, to respectively form eligible training data of the reference sample and the test sample, for use in subsequent training of the artificial intelligence model.

In the process of processing, by the processing module, the measurement results of the reference sample and the test sample to form the training data, different noise profiles constitute the noise panorama or at least the partial noise panorama. In addition, an overall measurement result of the two types of samples and the signal in the measurement result both present stable statistical properties. A statistical distribution pattern presented by the noise also tends to be stable with the construction of the noise panorama.

Further, the artificial intelligence model may be selected from, but is not limited to, an artificial neural network, a perceptron, a support vector machine, a Bayesian classifier, a Bayesian network, a random forest model, or a clustering model.

During a training process of the artificial intelligence model, the model iteratively performs a large amount of experiential learning, induction, and convergence on features that allow to recognize the signal and the noise, as well as features that allow to distinguish between the reference sample and the test sample, that are included in the training data, and learns a relationship between the features and preset labels.

Specifically, the features that allow to recognize the signal include a statistical distribution pattern presented after the processing of the plurality of measurement results and conforming to the real mathematical and statistical laws of the signal; the features that allow to recognize the noise include a statistical distribution pattern presented by the noise panorama or at least the partial noise panorama constructed by the diverse noise profiles and approaching the real mathematical and statistical laws of the noise; and the features that allow to distinguish between the reference sample and the test sample include statistical distribution patterns presented respectively after the processing of the plurality of measurement results of the reference sample and the test sample.

Further, the preset labels include output labels and input labels. The output labels include two labels respectively representing the reference sample and the test sample. The input labels are two sets of coupling labels respectively relating to the training data of the reference sample and the test sample, and each coupling label is associated with the rich condition measurement environment during the sample measurement.

Specifically, each coupling label from different sets represents a coupling of the measurement result of the reference sample or the test sample to the noise panorama in each independent measurement environment of the rich condition measurement environment. The noise profile included in the measurement result is a noise profile obtained in this independent measurement environment.

Beneficial effects of the present application are as follows:

1. The present invention is different from a noise processing solution in the prior art, providing a signal analysis method based on obtaining and recognizing a noise panorama distribution model from a completely different technical perspective, so as to solve the problem of noise reduction that can hardly be addressed in the prior art.

The field of signal detection often involves analysis-worthy signals that are drowned out by noise due to their extremely low strength and/or extremely complex characteristics. In this case, a distribution model of the noise cannot be reasonably assumed, which makes it difficult to effectively practice an existing noise reduction method that mathematically models a noise signal.

The signal analysis method provided in the present invention is based on the principle of mathematical statistics, and does not directly separate a signal from noise, but can still effectively distinguish between the noise and the signal. In addition, a plurality of independent signals are successfully recognized based on different measurement samples. Therefore, practical applications such as sample testing and material classification are carried out. In addition, the present invention utilizes artificial intelligence technology to perform mixed modeling on noise and a signal drowned out by the noise. Even if there are no mathematical assumptions about noise, the trained artificial intelligence model can deeply mine the hidden mathematical and statistical laws from the measurement results, and accurately obtain a mathematical distribution model of the signal and the noise.

2. In a sample measurement stage, the present invention does not set the measurement conditions consistently, but creates diverse measurement conditions to form a plurality of noise profiles that differ due to changes in the measurement conditions, and combines the plurality of noise profiles to constitute the noise panorama or at least the partial noise panorama, so as to recognize the mathematical distribution model of the noise. This operation does not cause loss and unintentional deletion of the signal, and avoids impact of the commonly used denoising steps in the prior art on the signal itself.

In the technical solutions disclosed in the present invention, a large number of repeated measurements under diverse measurement conditions allow a relatively stable data distribution form of the signal to be presented more clearly, thereby improving the visibility of the signal in the measurement results, which is beneficial for subsequent signal extraction and analysis. In addition, a perturbed environment provided by the diverse measurement conditions provides a different noise observation dimension for each sample measurement, ensuring sample randomness of the noise. On this basis, the noise panorama can be obtained through a large number of repeated measurements, that is, a large number of noise "samples" can almost completely cover all possibilities of the noise itself. At the same time, the distribution model of the noise tends to its real distribution form.

The present invention can discover the mathematical and statistical laws of the noise from the mixed data distribution form of the sample measurement results, and distinguish between the noise and the signal and recognize different types of signals from the perspective of the data distribution model. Based on this technical idea, in the sample measurement results, the noise and the signal respectively present their real mathematical and statistical laws. Compared with direct noise removal and signal extraction in the existing engineering technology, the present invention deeply mines the mathematical and statistical laws of the noise and the signal, which can avoid unintentional elimination of the signal in the denoising operation and ensure the effectiveness of data. Therefore, the noise does not interfere with signal analysis, nor does it affect recognition and classification of independent signals. It can be seen that the present invention provides an effective solution to the problem, unsolvable in the prior art, of removing the noise itself or extracting the signal itself from the mixed sample measurement results.

3. Since noise is an unavoidable factor in the actual sample measurement process, even under the most excellent sample measurement conditions at the current stage, a measurement result obtained in each sample measurement may be infinitely close to the real signal, but always changes near the signal only in a "statistically stable" manner. In addition, such a measurement result and the "statistically stable" changes of the noise therein are unpredictable, that is, it is impossible to assume the exact value of a next sample measurement result.

However, after a plurality of repeated acquisitions, a large number of measurement results generally present a data distribution model that tends to be stable. This stable data distribution model represents a macroscopic collection of all components in the measurement results interacting with each other. In other words, in addition to the real signal, interference factors that may cause noise, such as environmental complexity, equipment precision, and inherent impact of a sampling means, are all integrated into the overall distribution model of the above measurement results. Therefore, the overall distribution model of the measurement results can fully reflect their own characteristics. The distribution model of the measurement results tends to be stable, and the noise panorama or at least the partial noise panorama constituted by a large number of noise profiles also presents particular mathematical and statistical laws and approaches the real distribution model of the noise. The present invention distinguishes between the noise and the signal by recognizing a complete mathematical model of the noise, and a more comprehensive and accurate recognition result is obtained by using the recognition solution.

4. A highly empirical and more accurate analysis result can be obtained by deeply mining the data distribution model of the noise using the artificial intelligence model.

The noise profiles obtained through a large number of repeated sample measurement under the diverse measurement conditions can construct at least the partial noise panorama, and the data distribution model of the noise has tended to reflect the theoretical real distribution model of the noise. In this case, the present invention uses artificial intelligence technology to mine the distribution model of the noise.

In the technical solutions disclosed in the present invention, the sample measurement stage involves a plurality of sample measurements performed under diverse perturbation conditions, and therefore a large number of measurement results mixed with the signal and the noise are obtained. The above operation helps to obtain the noise panorama, and a large number of measurement values also provide a sufficient data basis for the training of the artificial intelligence model. The trained artificial intelligence model can discover, from high background noise data, real features that meet the analysis needs or the analysis objective of an experimenter, and can provide more efficient mathematical operations and output a highly empirical and more accurate analysis result in real time.

5. The present invention creates the rich condition measurement environment by different perturbation introduction means to add the noise observation dimension in the sample measurement, such that the measurement results under a large number of repeated measurement conditions can reveal a complete noise panorama, or can provide at least a partial noise panorama with sufficient accuracy for subsequent signal analysis. Different perturbation introduction means are different in practical difficulty, and may have different impact in terms of adding the noise observation dimension.

In practical applications of the technical solutions involved in the present invention, comprehensively considering various factors such as the characteristics of the sample itself, the sample measurement means, and the measurement precision requirements, the experimenter can completely select from the perturbation introduction means provided in the present invention according to their actual needs. The diverse perturbation introduction means disclosed in the present invention provide the experimenter with a wide range of selections, and also reduce the application difficulty of the present invention to a certain extent, making the technical solution more valuable for popularization and application.

BRIEF DESCRIPTION OF THE DRAWINGS

FIG. 1 is a schematic flowchart of a signal analysis method based on obtaining and recognizing a noise panorama distribution model according to the present invention.

FIG. 2 is a schematic flowchart of step 2 in the signal analysis method shown in FIG. 1 of the specification.

FIG. 3 is a schematic structural diagram of a signal analysis system based on obtaining and recognizing a noise panorama distribution model according to the present invention.

DETAILED DESCRIPTION OF EMBODIMENTS

Figure 4:
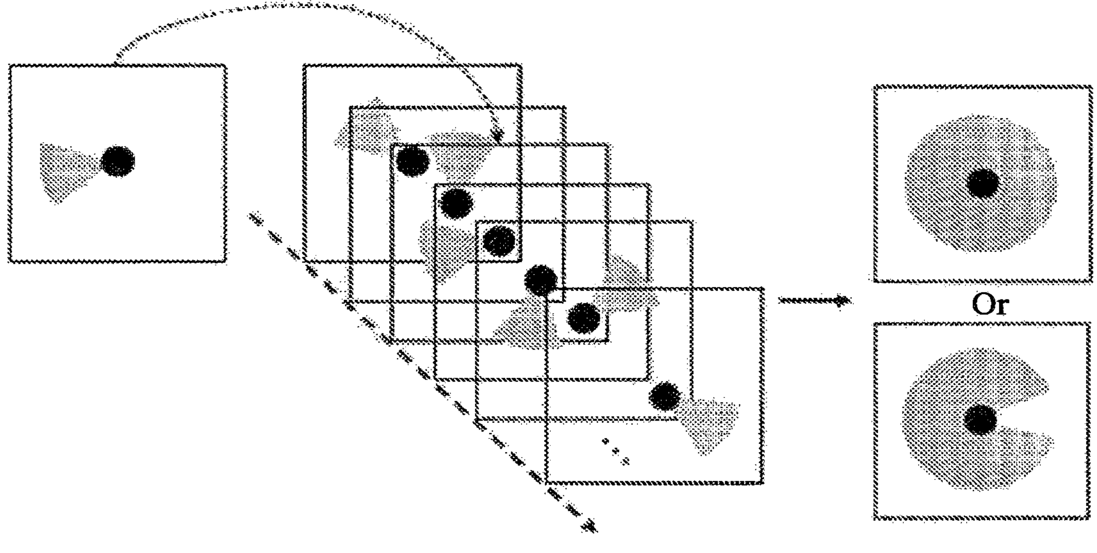
FIG. 4 is a schematic principle diagram of formation of a noise panorama or at least a partial noise panorama by a plurality of noise profiles.

Signal processing is intended to extract useful information, e.g., research-worthy content or distinguishing characteristics different from other signals, from a sample measurement result. Due to many uncertain factors during sample measurement, the "research-worthy content" and "distinguishing characteristics" often cannot be represented by independent values, but are reflected by an overall statistical distribution of a signal.

In addition to a signal reflecting real characteristics, a measurement result obtained during actual sample measurement is necessarily mixed with noise. The signal processing solutions disclosed in the prior art either eliminate impact of noise from the measurement result, or extract the signal from the measurement result. However, when the noise mixed in the measurement result cannot be simulated by a "known" mathematical model, it is extremely difficult to eliminate the noise or extract the signal. Therefore, the technical objective of the present invention is to find an "unknown" distribution model of a signal and noise from measurement results based on the principle of data statistics, so as to effectively distinguish between the signal and the noise. In addition, when the measurement results come from different measurement samples, a sample type can be accurately identified by finding a differentiated data distribution model.

For each sample measurement, a signal and noise in an obtained measurement result are slightly different from those in results obtained in previous measurements. As explained from the perspective of samples and sampling, each sample measurement is equivalent to a random sampling in the sample population, and a measurement result corresponding to the random sampling cannot reflect the real characteristics. However, with the premise that the signal and noise each have a specific data statistical law and conform to a specific data distribution model, when the number of measurements increases and the sampling range expands to approach the sample population, an overall data statistical law reflected by a large number of test results tends to reflect the real situation.

More specifically: 1. Since the signal reflects inherent characteristics of a test sample, the signal in the measurement result necessarily has a definite statistical distribution model. This definite statistical distribution model can be clearly presented through a large amount of data sampling. 2. For the noise in the measurement result, the prior art generally believes that an "ideal" mathematical and statistical law of the noise conforms to the Gaussian distribution. However, an actual sample measurement process often cannot create an "ideal" noise situation. Moreover, even if the conditions for sample measurement are optimized as much as possible by means of increasing equipment precision, improving material purity, etc., a measurement result having an ideal analysis condition may still not be obtained. In other words, a target signal to be analyzed is drowned out by noise due to its low strength, or the signal has extremely complex characteristics that are difficult to analyze.

It is often difficult to mine a data distribution model for such measurement results, and it is even impossible to assume a distribution model of the noise. Under such circumstances, the present invention implements sample measurement in a perturbed environment by creating diverse measurement conditions, and generates noise profiles from a plurality of observation dimensions. When the number of sample measurements is large enough, a comprehensive observation of the noise can be reflected, that is, a noise panorama that can reveal a complete data statistical distribution model is constructed, and this data statistical distribution model infinitely approaches the real distribution of the noise. It can be seen that from a statistical point of view, it is completely theoretically feasible to reveal the statistical distribution model of the noise by the construction of the noise panorama in a perturbed environment.

In the case that at least a partial noise panorama has been obtained, and the noise has presented a clear and stable distribution model, the present invention uses an artificial intelligence technology to deeply explore the statistical laws of the noise. Artificial intelligence technology is an effective means for various types of data analysis and solving empirical data processing. For example, an artificial intelligence deep learning model can simulate a human learning process and quickly summarize an empirical data processing method of human, so as to implement signal recognition and determination behavior. In the present invention, the accuracy of an empirical analysis result output by an artificial intelligence model trained by big data can be ensured, so that a mathematical distribution model of the noise is effectively recognized, and subsequent noise separation, signal classification, and other specific analysis work are carried out based on this.

In order to make the objectives, technical solutions, and advantages of the present invention clearer, the present invention is described in further detail below with reference to the embodiments. It should be understood that specific embodiments described herein are only intended to explain the present invention, rather than to limit the present invention.

Embodiment 1

For a schematic flowchart of a signal analysis method based on obtaining and recognizing a noise panorama distribution model, refer to FIG. 1 of the specification. The method includes the following steps.

S1: In a rich condition measurement environment, perform repeated measurements on a reference sample and a test sample to respectively obtain a plurality of measurement results, where each measurement result includes a signal and different noise profiles.

In the technical field of signal acquisition and analysis, maintaining the consistency of external conditions during sample measurement is a conventional means to reduce noise fluctuations and form a good signal-to-noise ratio, and repeated sample measurements are also considered as an effective way to reduce random errors. However, the embodiment of the present invention does not relate to the consistent setting of the external conditions, but carries out repeated measurements of the reference sample and the test sample in a rich condition measurement environment. A rich condition is a natural measurement condition that is not aimed to maintain the consistency of external conditions, does not involve noise suppression, and includes real complex noise factors. The purpose of both the "rich condition measurement environment" and the "repeated measurements" is to obtain abundant noise profiles that are sufficient to construct a noise panorama.

Specifically, in the rich condition measurement environment, due to the properties of the sample itself, the signal in the measurement results of the reference sample and the test sample always remains statistically unchanged, but the noise varies due to environmental changes, that is, the environmental changes increase observation dimensions of the noise. The repeated measurements of the reference sample and the test sample are performed based on the noise observation dimensions of multi-directional, multi-angle, and multi-spatio-temporal characteristics, so as to form the abundant noise profiles. The abundant noise profiles are the basis for constructing the noise panorama and recognizing the noise based on a data statistical law in subsequent steps.

S2: Process the measurement results of the reference sample and the test sample to respectively form training data of the reference sample and the test sample, where the training data includes a noise panorama or at least a partial noise panorama constituted by a plurality of noise profiles.

As shown in FIG. 4 of the specification, in a single noise observation dimension, only a noise profile reflecting a local part of the noise can be obtained, and a comprehensive noise observation result cannot be obtained, that is, the noise cannot present the complete data statistical laws that conform to its real distribution characteristics. However, in this embodiment of the present invention, the repeated measurements of the reference sample and the test sample are performed in the rich condition measurement environment. The abundant noise profiles obtained in different noise observation dimensions are sufficient to construct the noise panorama or at least the partial noise panorama. With the construction of the noise panorama, the data statistical laws of the noise tend to its real mathematical and statistical laws.

In this embodiment of the present invention, the noise panorama means that the distribution model of the noise has been able to fully reflect its theoretical real distribution model. The partial noise panorama means that the distribution model of the noise cannot fully reflect its theoretical real distribution model, but the distribution model already has the accuracy that can be used for subsequent signal analysis.

S3: Based on the training data of the reference sample and the test sample, with the observability of the noise as a convergence goal, train an artificial intelligence model, to enable the model to recognize the signal and the noise from the measurement results, and distinguish between the reference sample and the test sample.

In this embodiment of the present invention, the training data of the reference sample and the test sample is randomly assigned as learning data and testing data according to a preset proportion, respectively. The artificial intelligence model is trained using the learning data, and the testing data is input to the trained artificial intelligence model to calculate a signal recognition result. If signal recognition accuracy is lower than a preset threshold, the training is continued using the learning data. If the signal recognition accuracy is higher than the preset threshold, it is considered that the training of the artificial intelligence model has been completed.

S4: Input a measurement result of a sample to be recognized to the trained artificial intelligence model, where an output result of the artificial intelligence model is a specific type of the sample to be recognized.

In this embodiment of the present invention, the reference sample and the test sample are used as two types of known samples, and the plurality of measurement results thereof are processed to respectively form the training data, and the trained artificial intelligence model can effectively distinguish between the two types of known samples. When the sample to be recognized is one of the two types of known samples, the artificial intelligence model can accurately recognize the specific type of the sample to be recognized.

Optionally, in step S1, before each measurement of the reference sample and the test sample, the rich condition measurement environment is created by introducing perturbations, to add a noise observation dimension, such that a measurement result of each measurement includes different noise profiles.

Further, the perturbations introduced before each measurement of the reference sample and the test sample may be selected from, but are not limited to, a spatial perturbation, a temporal perturbation, a physical perturbation, and an environmental perturbation.

The spatial perturbation includes, but is not limited to, a slight displacement of a measurement site and a slight rotation of the measurement site; the temporal perturbation includes, but is not limited to, increasing a measurement duration, reducing the measurement duration, and changing a time interval between a plurality of measurements; the physical perturbation includes, but is not limited to, vibration of measurement equipment or the samples and agitation of a fluid sample during the measurement; and the environmental perturbation includes, but is not limited to, changing ambient temperature during the measurement, changing ambient humidity during the measurement, changing an electromagnetic field during the measurement, and changing barometric pressure during the measurement.

Referring to FIG. 2 of the specification, in step S2, the step of processing the measurement results of the reference sample and the test sample to respectively form training data of the reference sample and the test sample includes:

S21: normalizing the measurement results of the reference sample and the test sample; and

S22: establishing a posterior probability model framework based on normalization results of step S21.

After the measurement results of the reference sample and the test sample are processed in steps S21 and S22, eligible training data thereof is formed respectively, for use in subsequent training of an artificial intelligence model.

Specifically, in this embodiment of the present invention, the measurement results of the reference sample and the test sample are considered as measurement values obtained by measuring a measurement object constituted by a complex system.

A measurement density function is defined as $\tilde{\rho}(S, V)$, where S is a measurement space dimension; and V is a measurement environment. Then in the measurement object, the number of systems is N, where N is defined by formula (1):

$$\int \tilde{\rho}(S, V) d\Omega = N \tag{1}$$

B(V) is defined as a measurement function, and then a measurement value $\tilde{B}(V)$ is:

$$\tilde{B}(V) = \int B(V) \rho(S, V) d\Omega \tag{2}$$

where $$\rho(S, V) = \tilde{\rho}(S, V)/N \tag{3}$$

Formula (3) is a normalization condition. In this embodiment of the present invention, in order to make the measurement results of the reference sample and the test sample meet the normalization condition of formula (3), step S21 is used to normalize the measurement results of the reference sample and the test sample.

Since the measurement of the reference sample and the test sample is repeated, the repeated process is expressed in a discrete manner, and formula (2) is rewritten into an ensemble form:

$$\tilde{B}(V) = \sum_S B_S \rho_S(V) = \langle V \rangle \tag{4}$$

Defining H as an ensemble density function, then:

$$\langle V \rangle = H\langle n \rangle \tag{5}$$

Statistical fluctuations of the complex system are then:

$$\delta n = \left(\frac{\partial n}{\partial P}\right)_S \delta P + \left(\frac{\partial n}{\partial S}\right)_P \delta S \tag{6}$$

where for the repeated measurement, δS is an information entropy of the measurement, and δP is an environmental change amount of the measurement.

δP is used as a statistical space of the noise panorama, while δS is used as a statistical space of the signal. Therefore, according to the Bayes' formula, then:

$$P(\delta n \mid H < n >) = \frac{P(H < n > \mid \delta n) P(\delta n)}{P(H < n >)} \tag{7}$$

In formula (7), $$\frac{P(H < n > \mid \delta n)}{P(H < n >)}$$

is defined as formula (8), formula (8) being a posterior probability condition. In this embodiment of the present invention, in order to make the measurement results of the reference sample and the test sample meet the posterior probability condition of formula (8), step S22 is used to establish a posterior probability model framework based on the normalization results obtained in step S21.

Then an estimation δn* of the statistical fluctuations of the complex system is:

$$\delta n^* = \operatorname{argmax}_{\delta n} P(H\langle n\rangle \mid \delta n) P(\delta n) \tag{9}$$

In this embodiment of the present invention, the measurement results processed in steps S21 and S22 can meet the normalization condition of formula (3) and the posterior probability condition of formula (8). The measurement results that meet the above two conditions can be used to estimate the statistical fluctuations of the complex system in formula (9). The measurement results that meet the above two conditions are used as the training data for the subsequent training step of the artificial intelligence model.

In the process of forming the training data from the measurement results of the reference sample and the test sample, different noise profiles constitute the noise panorama or at least the partial noise panorama. In addition, an overall measurement result of the two types of samples and the signal in the measurement result both present stable statistical properties. A statistical distribution pattern presented by the noise also tends to be stable with the construction of the noise panorama.

In step S3, the artificial intelligence model may be selected from, but is not limited to, an artificial neural network, a perceptron, a support vector machine, a Bayesian classifier, a Bayesian network, a random forest model, or a clustering model.

In this embodiment of the present invention, the statistical fluctuations of the complex system in formula (9) are to be estimated by the artificial intelligence model.

Embodiment 2

For a schematic structural diagram of a signal analysis system based on obtaining and recognizing a noise panorama distribution model, refer to FIG. 3 of the specification. The system includes a measurement module 1, a processing module 2, a training module 3, and an analysis module 4.

In a rich condition measurement environment, the measurement module 1 performs repeated measurements on a reference sample and a test sample to respectively obtain a plurality of measurement results, where each measurement result includes a signal and different noise profiles.

In the technical field of signal acquisition and analysis, maintaining the consistency of external conditions during sample measurement is a conventional means to reduce noise fluctuations and form a good signal-to-noise ratio, and repeated sample measurements are also considered as an effective way to reduce random errors. However, the embodiment of the present invention does not relate to the consistent setting of the external conditions, but the measurement module 1 carries out repeated measurements of the reference sample and the test sample in a rich condition measurement environment. A rich condition is a natural measurement condition that is not aimed to maintain the consistency of external conditions, does not involve noise suppression, and includes real complex noise factors. The purpose of both the "rich condition measurement environment" and the "repeated measurements" is to obtain abundant noise profiles that are sufficient to construct a noise panorama.

Specifically, in the rich condition measurement environment, due to the properties of the sample itself, the signal in the measurement results of the reference sample and the test sample always remains statistically unchanged, but the noise varies due to environmental changes, that is, the environmental changes increase observation dimensions of the noise. The measurement module 1 performs repeated measurements of the reference sample and the test sample based on the noise observation dimensions of multi-directional, multi-angle, and multi-spatio-temporal characteristics, so as to form the abundant noise profiles. The abundant noise profiles are the basis for subsequently constructing the noise panorama and recognizing the noise based on a data statistical law.

The processing module 2 processes the measurement results of the reference sample and the test sample to respectively form training data of the reference sample and the test sample, where the training data includes a noise panorama or at least a partial noise panorama constituted by a plurality of noise profiles.

As shown in FIG. 4 of the specification, in a single noise observation dimension, only a noise profile reflecting a local part of the noise can be obtained, and a comprehensive noise observation result cannot be obtained, that is, the noise cannot present a complete data statistical law that conforms to its real distribution characteristics. However, in this embodiment of the present invention, the repeated measurements of the reference sample and the test sample are performed in the rich condition measurement environment. The abundant noise profiles obtained in different noise observation dimensions are sufficient for the processing module to construct the noise panorama or at least the partial noise panorama. With the construction of the noise panorama by the processing module 2, the data statistical laws of the noise tend to its real mathematical and statistical laws.

In this embodiment of the present invention, the noise panorama means that the distribution model of the noise has been able to fully reflect its theoretical real distribution model. The partial noise panorama means that the distribution model of the noise cannot fully reflect its theoretical real distribution model, but the distribution model already has the accuracy that can be used for subsequent signal analysis.

Based on the training data of the reference sample and the test sample, with the observability of noise as a convergence goal, the training module 3 trains an artificial intelligence model, to enable the model to recognize the signal and the noise from the measurement results, and distinguish between the reference sample and the test sample.

In this embodiment of the present invention, the training data of the reference sample and the test sample is randomly assigned as learning data and testing data according to a preset proportion, respectively. The training module 3 trains the artificial intelligence model using the learning data, and inputs the testing data to the trained artificial intelligence model to calculate a signal recognition result. If signal recognition accuracy is lower than a preset threshold, the training is continued using the learning data. If the signal recognition accuracy is higher than the preset threshold, it is considered that the training of the artificial intelligence model has been completed.

The analysis module 4 inputs a measurement result of a sample to be recognized to the trained artificial intelligence model, where an output result of the artificial intelligence model is a specific type of the sample to be recognized.

In this embodiment of the present invention, the reference sample and the test sample are used as two types of known samples, and the plurality of measurement results thereof are processed to respectively form the training data, and the trained artificial intelligence model can effectively distinguish between the two types of known samples. When the sample to be recognized is one of the two types of known samples, the artificial intelligence model can accurately recognize the specific type of the sample to be recognized.

Optionally, the measurement module 1 includes a perturbation mechanism 11, and before the measurement module 1 performs each measurement of the reference sample and the test sample, the perturbation mechanism 11 creates the rich condition measurement environment by introducing perturbations, to add a noise observation dimension for the sample measurement, such that a measurement result of each sample measurement includes different noise profiles.

Further, the perturbations introduced by the perturbation mechanism 11 before each measurement of the reference sample and the test sample may be selected from, but are not limited to, a spatial perturbation, a temporal perturbation, a physical perturbation, and an environmental perturbation.

The spatial perturbation includes, but is not limited to, a slight displacement of a measurement site and a slight rotation of the measurement site; the temporal perturbation includes, but is not limited to, increasing a measurement duration, reducing the measurement duration, and changing a time interval between a plurality of measurements; the physical perturbation includes, but is not limited to, vibration of measurement equipment or the samples and agitation of a fluid sample during the measurement; and the environmental perturbation includes, but is not limited to, changing ambient temperature during the measurement, changing ambient humidity during the measurement, changing an electromagnetic field during the measurement, and changing barometric pressure during the measurement.

Further, the processing module 2 includes a normalization module 21 and a posterior probability module 22.

The normalization module 21 normalizes the measurement results of the reference sample and the test sample to respectively output normalization results; and the posterior probability module 22 establishes a posterior probability model framework based on the normalization results, to respectively form eligible training data of the reference sample and the test sample, for use in subsequent training of the artificial intelligence model.

Specifically, in this embodiment of the present invention, the measurement results of the reference sample and the test sample are considered as measurement values obtained by measuring a measurement object constituted by a complex system.

A measurement density function is defined as O(S, where S is a measurement space dimension; and V is a measurement environment. Then in the measurement object, the number of systems is N, where N is defined by formula (1):

$$\int \tilde{\rho}(S, V)\, d\Omega = N \tag{1}$$

B(V) is defined as a measurement function, and then a measurement value $\tilde{B}(V)$ is:

$$\tilde{B}(V) = \int B(V)\tilde{\rho}(S, V)\, d\Omega \tag{2}$$

where $$\rho(S, V) = \tilde{\rho}(S, V)/N \tag{3}$$

Formula (3) is a normalization condition. In this embodiment of the present invention, in order to make the measurement results of the reference sample and the test sample meet the normalization condition of formula (3), the normalization module 21 normalizes the measurement results of the reference sample and the test sample, and outputs the normalization results.

Since the measurement of the reference sample and the test sample is repeated, the repeated process is expressed in a discrete manner, and formula (2) is rewritten into an ensemble form:

$$\tilde{B}(V) = \sum\nolimits_S B_S \rho_S(V) = \langle V \rangle \tag{4}$$

Defining H as an ensemble density function, then:

$$\langle V \rangle = H\langle n \rangle \tag{5}$$

Statistical fluctuations of the complex system are then:

$$\delta n = \left(\frac{\partial n}{\partial P}\right)_S \delta \mathrm{P} + \left(\frac{\partial n}{\partial S}\right)_P \delta S \tag{6}$$

where for the repeated measurement, δS is an information entropy of the measurement, and δP is an environmental change amount of the measurement.

δP is used as a statistical space of the noise panorama, while δS is used as a statistical space of the signal. Therefore, according to the Bayes' formula, then:

$$P(\delta n \mid H < n >) = \frac{P(H < n > \mid \delta n) P(\delta n)}{P(H < n >)} \tag{7}$$

In formula (7), $$\frac{P(H < n > \mid \delta n)}{P(H < n >)}$$

is defined as formula (8), formula (8) being a posterior probability condition. In this embodiment of the present invention, in order to make the measurement results of the reference sample and the test sample meet the posterior probability condition of formula (8), the posterior probability module 22 establishes a posterior probability model framework based on the normalization results.

Then an estimation $\delta n^*$ of the statistical fluctuations of the complex system is:

$$\delta n^* = \text{argmax}_{\delta n} P(H\langle n\rangle \mid \delta n) P(\delta n) \quad (9)$$

In this embodiment of the present invention, the measurement results processed by the normalization module 21 and the posterior probability module 22 can meet the normalization condition of formula (3) and the posterior probability condition of formula (8). The measurement results that meet the above two conditions can be used to estimate the statistical fluctuations of the complex system in formula (9). The measurement results that meet the above two conditions are used as the training data for the subsequent training step of the artificial intelligence model.

In the process of processing, by the processing module 2, the measurement results of the reference sample and the test sample to form the training data, different noise profiles constitute the noise panorama or at least the partial noise panorama. In addition, an overall measurement result of the two types of samples and the signal in the measurement result both present stable statistical properties. A statistical distribution pattern presented by the noise also tends to be stable with the construction of the noise panorama.

Further, the artificial intelligence model may be selected from, but is not limited to, an artificial neural network, a perceptron, a support vector machine, a Bayesian classifier, a Bayesian network, a random forest model, or a clustering model.

In this embodiment of the present invention, the statistical fluctuations of the complex system in formula (9) are to be estimated by the artificial intelligence model.

Embodiment 3

A signal analysis method based on obtaining and recognizing a noise panorama distribution model is provided. The method includes the following steps.

S1: In a rich condition measurement environment, perform repeated measurements on multiple types of known samples to respectively obtain a plurality of measurement results, where each measurement result includes a signal and different noise profiles.

In the technical field of signal acquisition and analysis, maintaining the consistency of external conditions during sample measurement is a conventional means to reduce noise fluctuations and form a good signal-to-noise ratio, and repeated sample measurements are also considered as an effective way to reduce random errors. However, the embodiment of the present invention does not relate to the consistent setting of the external conditions, but carries out repeated measurements of the multiple types of known samples in a rich condition measurement environment. A rich condition is a natural measurement condition that is not aimed to maintain the consistency of external conditions, does not involve noise suppression, and includes real complex noise factors. The purpose of both the "rich condition measurement environment" and the "repeated measurements" is to obtain abundant noise profiles that are sufficient to construct a noise panorama.

Specifically, in the rich condition measurement environment, due to the properties of the sample itself, the signal in the measurement results of each type of sample always remains statistically unchanged, but the noise varies due to environmental changes, that is, the environmental changes increase observation dimensions of the noise. The repeated measurements of each type of known sample are performed based on the noise observation dimensions of multi-directional, multi-angle, and multi-spatio-temporal characteristics, so as to form the abundant noise profiles. The abundant noise profiles are the basis for constructing the noise panorama and recognizing the noise based on a data statistical law in subsequent steps.

S2: Process the measurement results of the multiple types of known samples to respectively form training data of each type of known sample, where the training data includes a noise panorama or at least a partial noise panorama constituted by a plurality of noise profiles.

As shown in FIG. 4 of the specification, in a single noise observation dimension, only a noise profile reflecting a local part of the noise can be obtained, and a comprehensive noise observation result cannot be obtained, that is, the noise cannot present a complete data statistical law that conforms to its real distribution characteristics. However, in this embodiment of the present invention, the repeated measurements of the multiple types of known samples are performed in the rich condition measurement environment. The abundant noise profiles obtained in different noise observation dimensions are sufficient to construct the noise panorama or at least the partial noise panorama. With the construction of the noise panorama, the data statistical laws of the noise tend to its real mathematical and statistical laws.

In this embodiment of the present invention, the noise panorama means that the distribution model of the noise has been able to fully reflect its theoretical real distribution model. The partial noise panorama means that the distribution model of the noise cannot fully reflect its theoretical real distribution model, but the distribution model already has the accuracy that can be used for subsequent signal analysis.

S3: Based on the training data of the multiple types of known samples, with the observability of the noise as a convergence goal, train an artificial intelligence model, to enable the model to recognize the signal and the noise from the measurement results, and distinguish between the multiple types of known samples.

In this embodiment of the present invention, the training data of each type of known sample is randomly assigned as learning data and testing data according to a preset proportion, respectively. The artificial intelligence model is trained using the learning data, and the testing data is input to the trained artificial intelligence model to calculate a signal recognition result. If signal recognition accuracy is lower than a preset threshold, the training is continued using the learning data. If the signal recognition accuracy is higher than the preset threshold, it is considered that the training of the artificial intelligence model has been completed.

S4: Input a measurement result of a sample to be recognized to the trained artificial intelligence model, where an output result of the artificial intelligence model is a specific type of the sample to be recognized.

In this embodiment of the present invention, the plurality of measurement results of the multiple types of known samples are processed to respectively form the training data, and the trained artificial intelligence model can effectively distinguish each type of known sample. When the sample to be recognized is one of the multiple types of known samples, the artificial intelligence model can accurately recognize the specific type of the sample to be recognized.

Optionally, in step S1, before each measurement of each type of known sample, the rich condition measurement environment is created by introducing perturbations, to add a noise observation dimension, such that a measurement result of each measurement includes different noise profiles.

Further, the perturbations introduced before each measurement of each known sample may be selected from, but are not limited to, a spatial perturbation, a temporal perturbation, a physical perturbation, and an environmental perturbation.

The spatial perturbation includes, but is not limited to, a slight displacement of a measurement site and a slight rotation of the measurement site; the temporal perturbation includes, but is not limited to, increasing a measurement duration, reducing the measurement duration, and changing a time interval between a plurality of measurements; the physical perturbation includes, but is not limited to, vibration of measurement equipment or the samples and agitation of a fluid sample during the measurement; and the environmental perturbation includes, but is not limited to, changing ambient temperature during the measurement, changing ambient humidity during the measurement, changing an electromagnetic field during the measurement, and changing barometric pressure during the measurement.

In step S2, the step of processing the measurement results of the multiple types of known samples to respectively form training data of each type of known sample includes:

S21: normalizing the measurement results of each type of known sample; and

S22: establishing a posterior probability model framework based on normalization results of step S21.

After the measurement results of the multiple types of known samples are processed in steps S21 and S22, eligible training data thereof is formed respectively, for use in subsequent training of an artificial intelligence model.

Specifically, in this embodiment of the present invention, the measurement results of each type of known sample are considered as measurement values obtained by measuring a measurement object constituted by a complex system.

A measurement density function is defined as O(S, where S is a measurement space dimension; and V is a measurement environment. Then in the measurement object, the number of systems is N, where N is defined by formula (1):

$$\int \tilde{\rho}(S, V)d\Omega = N \tag{1}$$

B(V) is defined as a measurement function, and then a measurement value $\tilde{B}(V)$ is:

$$\tilde{B}(V) = \int B(V)\tilde{\rho}(S, V)d\Omega \tag{2}$$

where $$\rho(S, V) = \tilde{\rho}(S, V)/N \tag{3}$$

Formula (3) is a normalization condition. In this embodiment of the present invention, in order to make the measurement results of each type of known sample meet the normalization condition of formula (3), step S21 is used to normalize the measurement results of each type of known sample.

Since the measurement of each type of known sample is repeated, the repeated process is expressed in a discrete manner, and formula (2) is rewritten into an ensemble form:

$$\tilde{B}(V) = \sum_S B_S \rho_S(V) = \langle V \rangle \tag{4}$$

Defining H as an ensemble density function, then:

$$\langle V \rangle = H\langle n \rangle \tag{5}$$

Statistical fluctuations of the complex system are then:

$$\delta n = \left(\frac{\partial n}{\partial P}\right)_S \delta P + \left(\frac{\partial n}{\partial S}\right)_P \delta S \tag{6}$$

where for the repeated measurement, δS is an information entropy of the measurement, and δP is an environmental change amount of the measurement.

δP is used as a statistical space of the noise panorama, while δS is used as a statistical space of the signal. Therefore, according to the Bayes' formula, then:

$$P(\delta n \mid H < n >) = \frac{P(H < n > \mid \delta n)P(\delta n)}{P(H < n >)} \tag{7}$$

In formula (7), $$\frac{P(H < n > \mid \delta n)}{P(H < n >)}$$

is defined as formula (8), formula (8) being a posterior probability condition. In this embodiment of the present invention, in order to make the measurement results of each type of known sample meet the posterior probability condition of formula (8), step S22 is used to establish a posterior probability model framework based on the normalization results obtained in step S21.

Then an estimation δn* of the statistical fluctuations of the complex system is:

$$\delta n^* = \text{argmax}_{\delta n} P(H\langle n \rangle \mid \delta n)P(\delta n) \tag{9}$$

In this embodiment of the present invention, the measurement results processed in steps S21 and S22 can meet the normalization condition of formula (3) and the posterior probability condition of formula (8). The measurement results that meet the above two conditions can be used to estimate the statistical fluctuations of the complex system in formula (9). The measurement results that meet the above two conditions are used as the training data for the subsequent training step of the artificial intelligence model.

In the process of forming the training data from the measurement results of each type of known sample, different noise profiles constitute the noise panorama or at least the partial noise panorama. In addition, an overall measurement result of each type of known sample and the signal in the measurement result both present stable statistical properties. A statistical distribution pattern presented by the noise also tends to be stable with the construction of the noise panorama.

In step S3, the artificial intelligence model may be selected from, but is not limited to, an artificial neural network, a perceptron, a support vector machine, a Bayesian classifier, a Bayesian network, a random forest model, or a clustering model.

In this embodiment of the present invention, the statistical fluctuations of the complex system in formula (9) are to be estimated by the artificial intelligence model.

The foregoing embodiments are only intended to illustrate rather than limit the technical solutions of the present invention. Any variation or replacement readily figured out by a person skilled in the art within the technical scope disclosed in the present invention shall fall within the scope of protection of the present invention. Therefore, the scope of protection of the present invention shall be subject to the scope of protection defined by the claims.

The invention claimed is:

1. A signal analysis method based on obtaining and recognizing a noise panorama distribution model, comprising the following steps:

S1: in a rich condition measurement environment, performing repeated measurements on a reference sample and a test sample to respectively obtain a plurality of measurement results, wherein each measurement result comprises a signal and different noise profiles, and a rich condition is a natural measurement condition that is not aimed to maintain consistency of external conditions, does not involve noise suppression, and comprises real complex noise factors;

S2: processing the measurement results of the reference sample and the test sample to respectively form training data of the reference sample and the test sample, wherein the training data comprises a noise panorama or a partial noise panorama constituted by a plurality of noise profiles, the noise panorama is a predicted data statistical distribution model of a noise obtained by noise modeling;

S3: based on the training data of the reference sample and the test sample, training an artificial intelligence model, to enable the model to recognize the signal and the noise from the measurement results, and distinguish between the reference sample and the test sample; and S4: inputting a measurement result of a sample to be recognized to the trained artificial intelligence model, wherein the trained artificial intelligence model outputs an identification result indicating whether the sample to be recognized is the reference sample or the test sample.

2. The signal analysis method based on obtaining and recognizing a noise panorama distribution model according to claim 1, wherein in step S1, before each measurement of the reference sample and the test sample, the rich condition measurement environment is created by introducing perturbations, to add a noise observation dimension, such that a measurement result of each measurement comprises different noise profiles.

3. The signal analysis method based on obtaining and recognizing a noise panorama distribution model according to claim 2, wherein the perturbations are selected from, but are not limited to, a spatial perturbation, a temporal perturbation, a physical perturbation, and an environmental perturbation; and wherein the spatial perturbation includes a slight displacement of a measurement site and a slight rotation of the measurement site; the temporal perturbation includes increasing a measurement duration, reducing the measurement duration, and changing a time interval between a plurality of measurements; the physical perturbation includes vibration of measurement equipment or the samples and agitation of a fluid sample during the measurement; and the environmental perturbation includes changing ambient temperature during the measurement, changing ambient humidity during the measurement, changing an electromagnetic field during the measurement, and changing barometric pressure during the measurement.

4. The signal analysis method based on obtaining and recognizing a noise panorama distribution model according to claim 1, wherein in step S2, the step of processing the measurement results of the reference sample and the test sample to respectively form training data of the reference sample and the test sample comprises:

S21: normalizing the measurement results of the reference sample and the test sample; and S22: establishing a posterior probability model framework based on normalization results of step S21;

and wherein after the measurement results of the reference sample and the test sample are processed in steps S21 and S22, eligible training data thereof is formed respectively, for use in subsequent training of an artificial intelligence model.

5. The signal analysis method based on obtaining and recognizing a noise panorama distribution model according to claim 1, wherein in step S3, the artificial intelligence model is selected from, but is not limited to, an artificial neural network, a perceptron, a support vector machine, a Bayesian classifier, a Bayesian network, a random forest model, or a clustering model.

6. The signal analysis method based on obtaining and recognizing a noise panorama distribution model according to claim 1, wherein in step S3, during a training process of the artificial intelligence model, the model iteratively performs experiential learning, induction, and convergence on features that allow to recognize the signal and features that allow to recognize the noise, as well as features that allow to distinguish between the reference sample and the test sample, that are comprised in the training data, and learns a relationship between the features and preset labels;

and wherein the features that allow to recognize the signal comprise a statistical distribution pattern presented after the processing of the plurality of measurement results and conforming to the real mathematical and statistical laws of the signal; the features that allow to recognize the noise comprise a statistical distribution pattern presented by the noise panorama constructed by diverse noise profiles and approaching the real mathematical and statistical laws of the noise; and the features that allow to distinguish between the reference sample and the test sample comprise statistical distribution patterns presented respectively after the processing of the plurality of measurement results of the reference sample and the test sample.

7. The signal analysis method based on obtaining and recognizing a noise panorama distribution model according to claim 6, wherein the preset labels comprise output labels and input labels; and wherein the output labels comprise two labels respectively representing the reference sample and the test sample; the input labels are two sets of coupling labels respectively relating to the training data of the reference sample and the test sample, and each coupling label is associated with the rich condition measurement environment during the sample measurement; and each coupling label from different sets represents a coupling of the measurement result of the reference sample or the test sample to the noise panorama in each independent measurement environment of the rich condition measurement environment; and wherein the noise profile comprised in the measurement result is a noise profile obtained in this independent measurement environment.

8. A signal analysis system based on obtaining and recognizing a noise panorama distribution model, comprising a measurement module, a processing module, a training module, and an analysis module; wherein in a rich condition measurement environment, the measurement module performs repeated measurements on a reference sample and a test sample to respectively obtain a plurality of measurement results, wherein each measurement result comprises a signal and different noise profiles;

the processing module processes the measurement results of the reference sample and the test sample to respectively form training data of the reference sample and the test sample, wherein the training data comprises a noise panorama or a partial noise panorama constituted by a plurality of noise profiles, the noise panorama is a predicted data statistical distribution model of a noise obtained by noise modeling;

based on the training data of the reference sample and the test sample the training module trains an artificial intelligence model, to enable the model to recognize the signal and the noise from the measurement results, and distinguish between the reference sample and the test sample; and the analysis module inputs a measurement result of a sample to be recognized to the trained artificial intelligence model, wherein the trained artificial intelligence model outputs an identification result indicating whether the sample to be recognized is the reference sample or the test sample.

9. The signal analysis system based on obtaining and recognizing a noise panorama distribution model according to claim 8, wherein the measurement module comprises a perturbation mechanism, and before the measurement module performs each measurement of the reference sample and the test sample, the perturbation mechanism creates the rich condition measurement environment by introducing perturbations, to add a noise observation dimension for the sample measurement, such that a measurement result of each sample measurement comprises different noise profiles;

and wherein the perturbations introduced by the perturbation mechanism before each measurement of the reference sample and the test sample are selected from, but are not limited to, a spatial perturbation, a temporal perturbation, a physical perturbation, and an environmental perturbation.

10. The signal analysis system based on obtaining and recognizing a noise panorama distribution model according to claim 8, wherein the processing module comprises a normalization module and a posterior probability module;

and wherein the normalization module normalizes the measurement results of the reference sample and the test sample to respectively output normalization results; and the posterior probability module establishes a posterior probability model framework based on the normalization results, to respectively form eligible training data of the reference sample and the test sample, for use in subsequent training of the artificial intelligence model.

* * * * *